Jan. 21, 1964 L. J. LECHTENBERG 3,118,433
AIR COOLED INTERNAL COMBUSTION ENGINE
Filed June 27, 1962 8 Sheets-Sheet 3

Jan. 21, 1964 L. J. LECHTENBERG 3,118,433
AIR COOLED INTERNAL COMBUSTION ENGINE
Filed June 27, 1962 8 Sheets-Sheet 4

Inventor
Leo J. Lechtenberg
By
Attorney

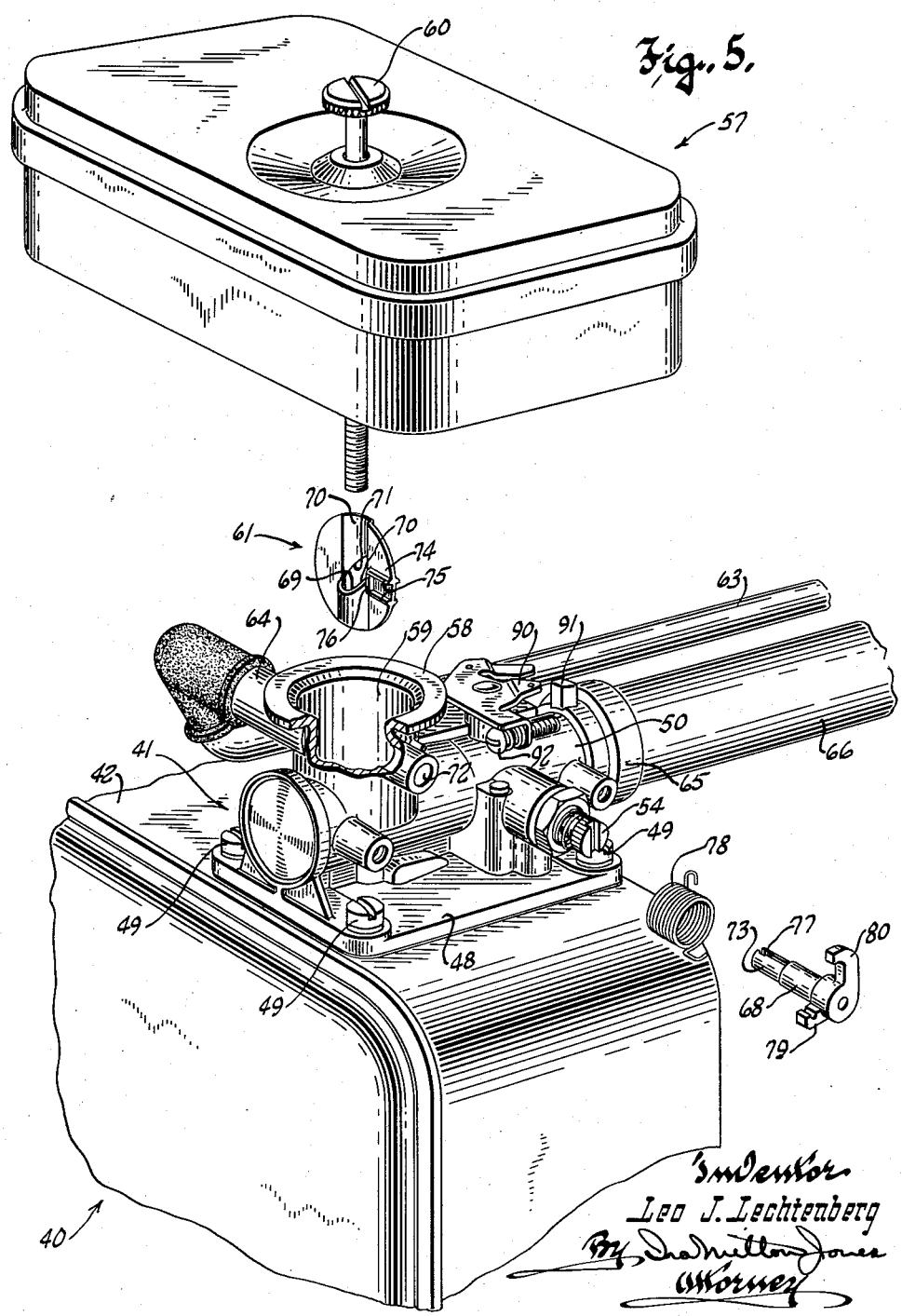

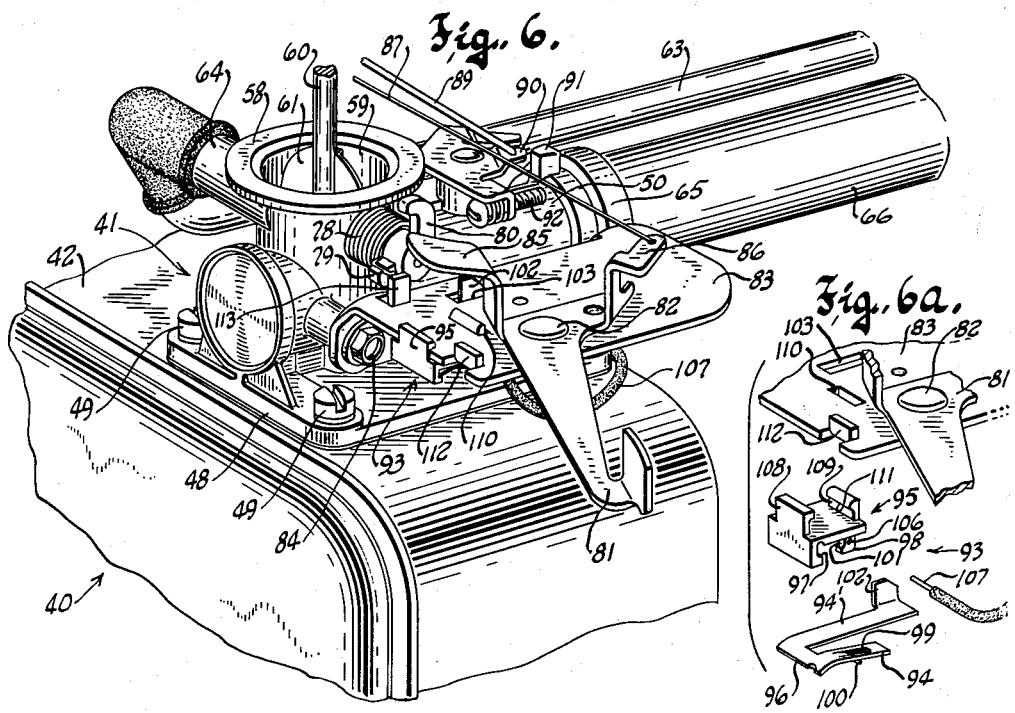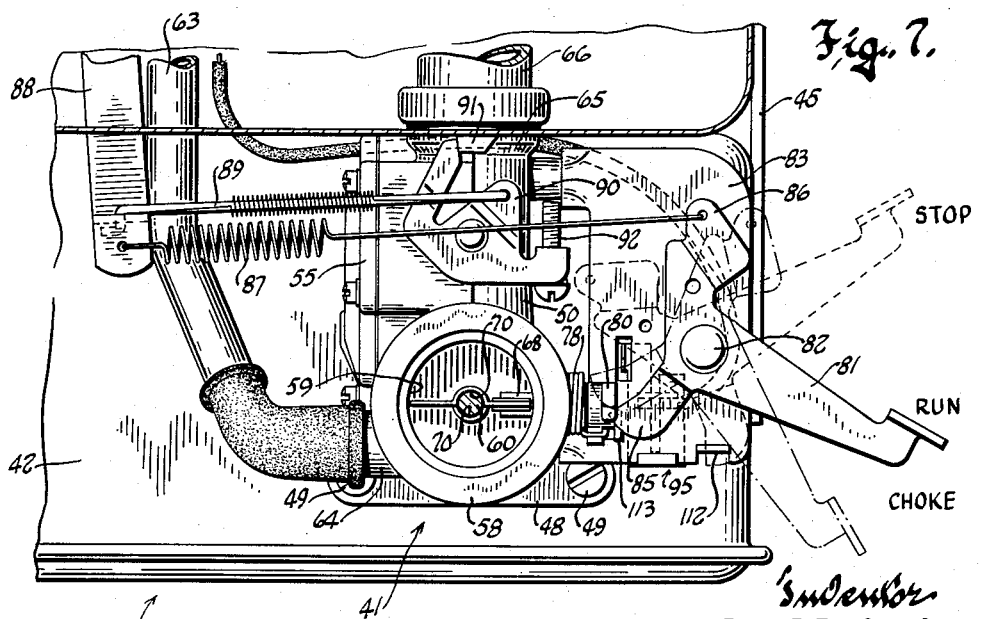

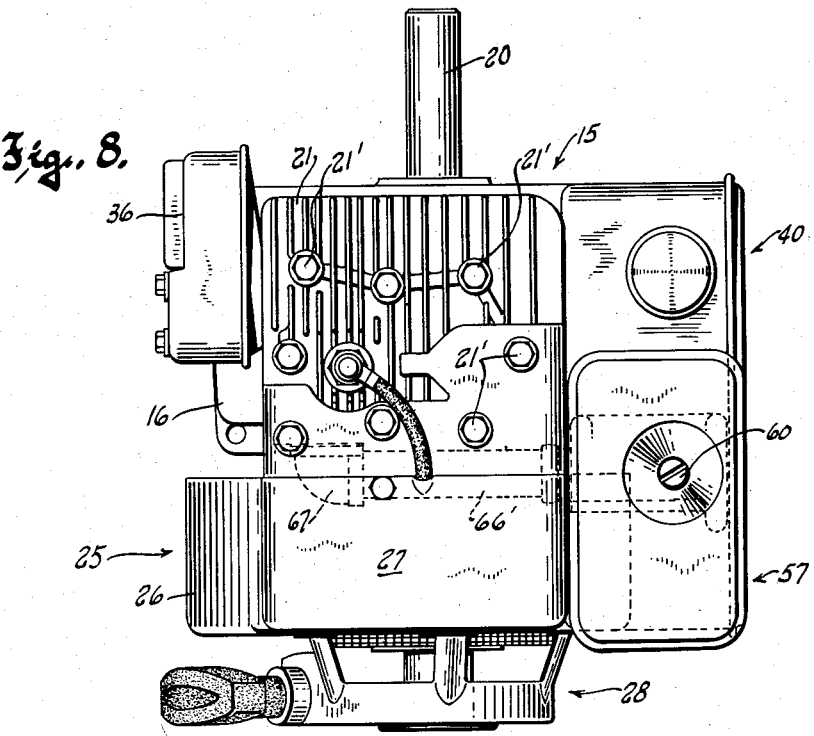
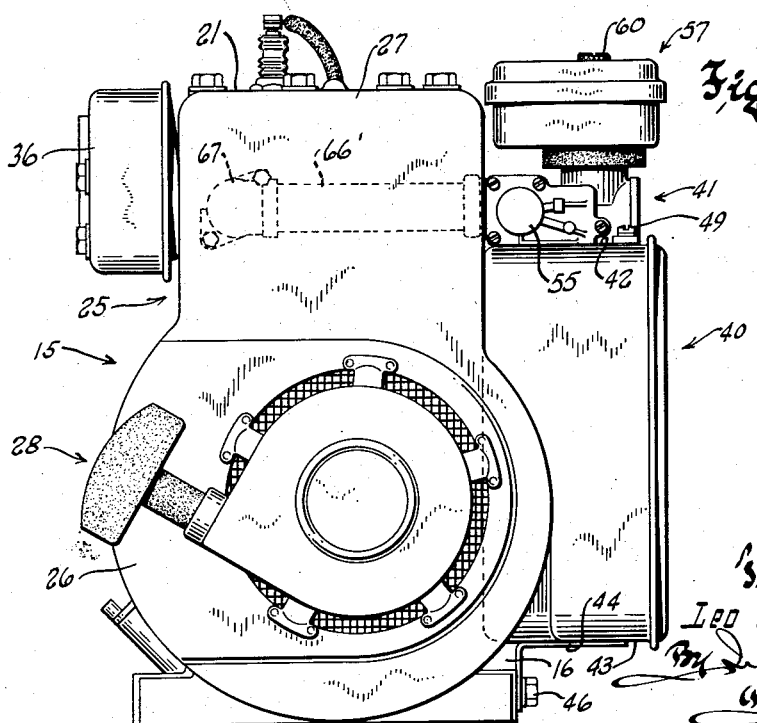

United States Patent Office 3,118,433
Patented Jan. 21, 1964

3,118,433
AIR COOLED INTERNAL COMBUSTION ENGINE
Leo J. Lechtenberg, Elm Grove, Wis., assignor to Briggs & Stratton Corporation, Milwaukee, Wis., a corporation of Delaware
Filed June 27, 1962, Ser. No. 205,658
11 Claims. (Cl. 123—41.31)

This invention relates to internal combustion engines and refers more particularly to single cylinder air-cooled engines of the type widely used on power lawn mowers.

In recent years, the so-called riding type of mower has become quite popular, so much so that many mower manufacturers have developed such machines for what might be considered the medium price market. To a large degree, the price reduction needed to achieve this purpose was made possible by using the engine of the conventional rotary mower, mounted as it always is on the deck of the mower housing, as the power source for the driving wheels of the machine. This of course means that the chassis of the machine must accommodate the engine which projects to a substantial height above the deck of the mower. Since the chassis of these machines consists essentially of a pair of spaced apart longitudinally extending rails which are not too far above the deck of the rotary mower, the engine must project up into the space between them.

The distance between the two longitudinal rails of the chassis, of necessity, is limited; hence, the choice of engine models that could be accommodated therein was limited. The limitation resulted from the fact that many models of engines—and especially those most desirable from the standpoint of price and horsepower—were very unsymmetrical, extending much further in one direction from the axis of the crankshaft than in the opposite direction; and since crankshaft location is fixed by the need for having the engine centrally located on the deck of the mower unit and the mower unit centered with respect to the chassis, those models of engines which manufacturers of equipment of this type most desired could not be used.

It is this situation which gave rise to the present invention.

Thus it can be said that the purpose and object of this invention is to provide an engine that is more symmetrical about the axis of its crankshaft than engines heretofore available.

Briefly stated, the desired symmetry has been achieved by having the carburetor of the engine located at the side of the cylinder opposite that at which the intake and exhaust ports are located, and connected with the intake port by a tube which extends across the intervening side of the cylinder. This arrangement produced the desired symmetry.

When the new engine was tested, a surprising discovery was made. Although the displacement was no greater than the earlier unsymmetrical engine, its horsepower was significantly increased. This was an unexpected "bonus," and to make certain that the advantage was not limited to an isolated instance, more tests were conducted on an engine of this invention and then on the very same engine but with the carburetor in the conventional location adjacent to the exhaust port and the muffler. The results proved the original observation to be correct. The engine of this invention had at least a one-tenth horsepower increase, which is a significant improvement over engines of this low horsepower.

Another unexpected advantage that came with this invention was the elimination of a serious governor problem. On certain models of the earlier engines difficulty was experienced in governing the speed of the engine. This was particularly so when centrifugally responsive mechanical governors were employed, since these are better able to maintain engine speed within close limits than the air vane type of governor.

Investigation of the problem prior to the advent of this invention led to the discovery that the objectionably high incident of governor "hunting" that plagued these prior engines, especially when equipped with the more sensitive mechanical governors, was caused by what might be loosely called a form of "vapor lock." Because of the close proximity of the carburetor to the exhaust port and muffler, air bubbles formed in the fuel-air mixture being fed to the engine, and as a result it did not run smoothly. To eliminate this condition some way of shielding the carburetor from the heat source was considered, but without too much success. However, in the engine of this invention, that problem has been entirely eliminated. The fuel-air mixture reaches the intake port from the carburetor unaffected by the heat which emanates from the region of the exhaust port.

In keeping with the objective of having the engine as symmetrical as possible about its crankshaft axis, its carburetor is of the type disclosed in the patent to Brown et al., No. 2,529,242, wherein engine suction draws the fuel into the mixing chamber of the carburetor directly from the tank, except that in this case the tank has a cup or reservoir in its upper portion which is kept full by a suction-actuated pump, and from which the suction tube lifts the fuel. This enables the fuel tank to be deeper and hence of sufficient size without requiring space that otherwise could be obtained only at the expense of symmetry.

The carburetor of Patent No. 2,529,242 was bolted to the side of the engine cylinder over its intake port, projecting therefrom cantilever-fashion, and the fuel tank was suspended from the underside of the carburetor. Because of that structural relationship, it was difficult to keep the carburetor securely fastened to the engine cylinder casting.

To overcome that objection, the engine of this invention has its fuel tank securely fastened to the crankcase-cylinder casting, and has the carburetor mounted on the top wall of the fuel tank. Because the tank is considerably larger than the mounting flange by which the carburetor of Patent No. 2,529,242, was mounted, it is of course possible to mount the tank on the engine in a manner which will assure against its being shaken loose.

Mounting the tank on the engine and having the carburetor "seated" upon the top wall of the tank, not only eliminates the objectionable possibility of having the carburetor work loose from its mounting but also contributes greatly to the attainment of the desired symmetry, since it enables the fuel tank to be located alongside the cylinder with its top wall substantially flush with the top side of the cylinder and locates the carburetor in the space directly above the fuel tank with no portion of the carburetor or its air cleaner projecting beyond the horizontal outline or boundary of the tank.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention, constructed according to the best modes so far devised for the practical application of the principles thereof, and in which:

FIGURE 5 is a separated perspective view of the carburetor, a portion of the fuel tank on which it is mounted, and the air cleaner;

FIGURE 6 is a perspective view of the assembled carburetor, but with the air cleaner omitted;

FIGURE 6a is a fragmentary perspective view illustrating a detail of the ignition grounding switch, with the various parts shown separated from one another;

FIGURE 7 is a top view of the carburetor and adjacent structure, but with the air cleaner removed;

FIGURE 8 is a top view of a horizontal shaft engine embodying features of this invention;

FIGURE 9 is an end view of the engine shown in FIGURE 8; and

Figure 1:
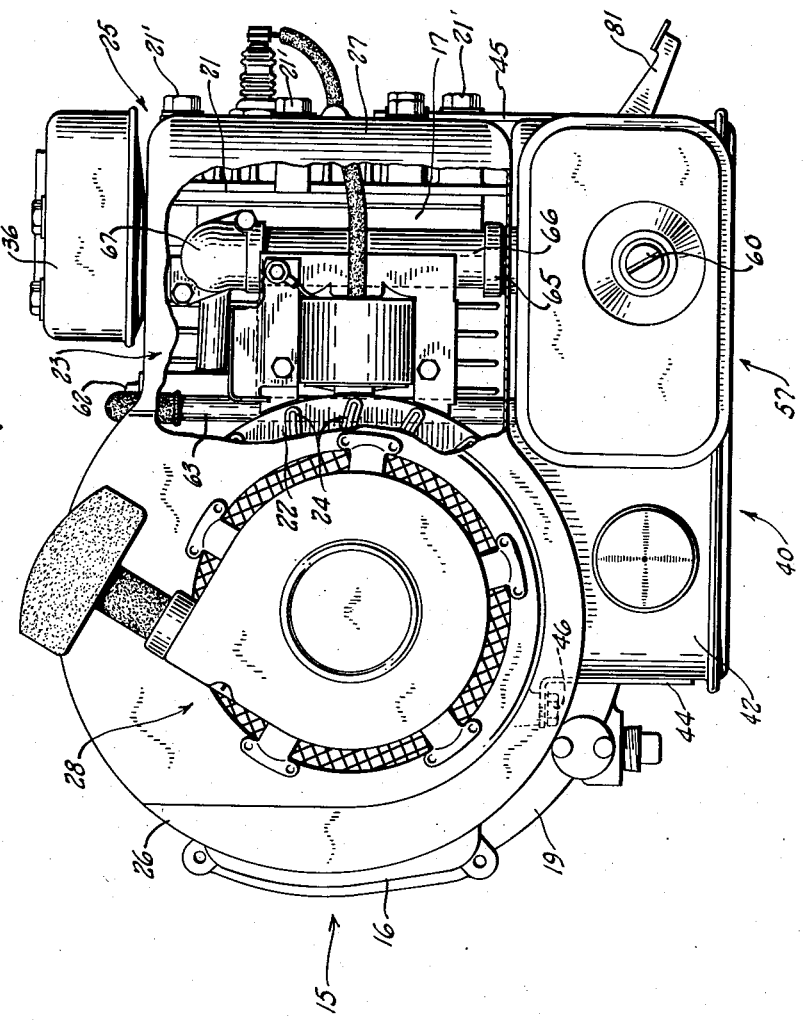
FIGURE 1 is a top plan view with parts broken away, of an air-cooled internal combustion engine embodying this invention.
Figure 2:
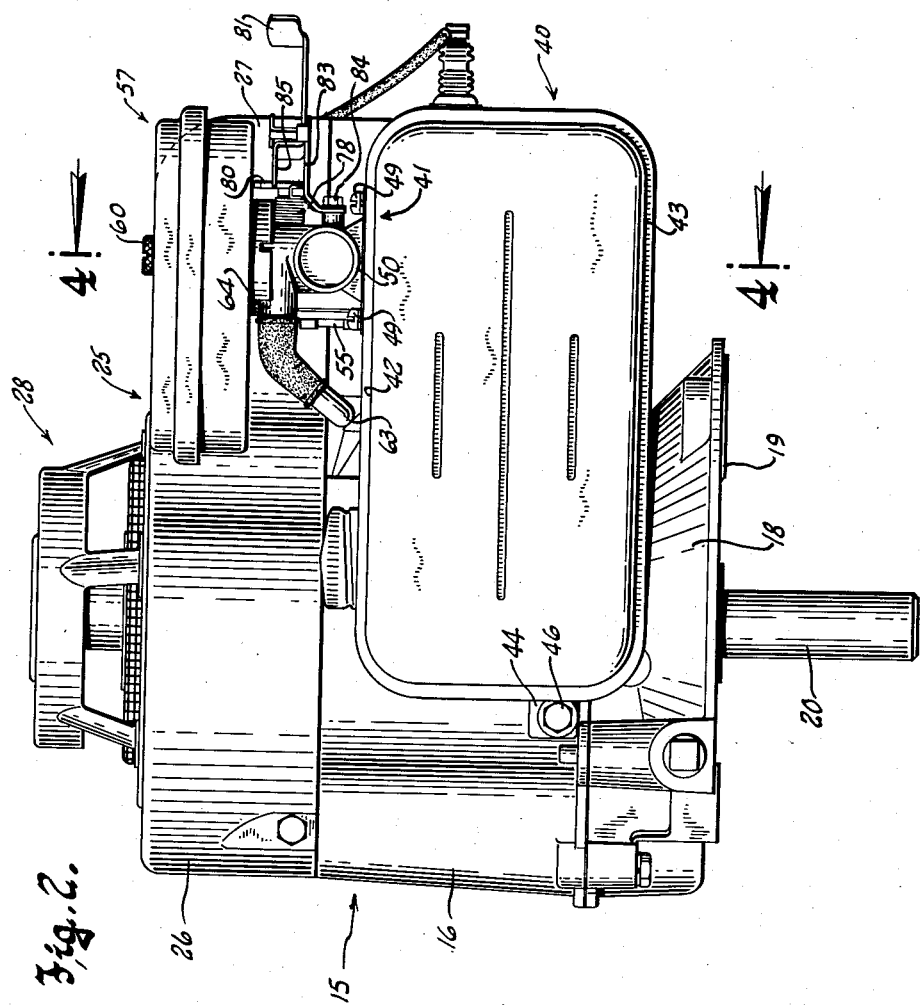
FIGURE 2 is a side elevational view of the engine showing the same from its side at which the fuel tank and carburetor are located.
Figure 3:
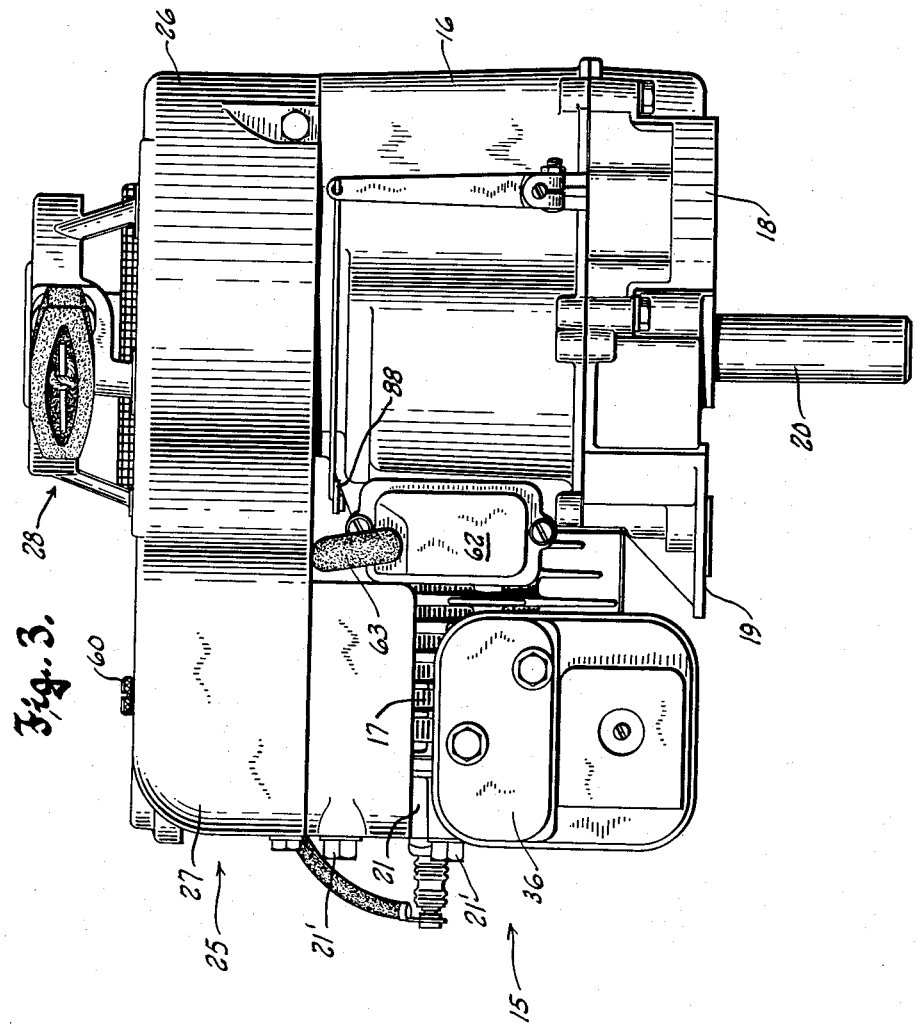
FIGURE 3 is an elevational view of the opposite side of the engine.

Referring now particularly to the accompanying drawings in which like numerals indicate like parts throughout the several views, the numeral 15 indicates generally the main body of the engine which preferably is a die casting such as that of the Lechtenberg Patent No. 2,693,789. Hence this main body casting forms all but one of the walls of the crankcase 16 and also the finned cylinder 17. The open side of the crankcase, in the vertical shaft engine shown in FIGURES 1 to 7, inclusive, is closed by a cover casting 18 which has the mounting flange 19 of the engine formed thereon and which also provides an oil sump for the crankcase and contains the lower crankshaft bearing (not shown). This lower bearing and another upper bearing also not shown, in the top wall of the crankcase rotatably mount the crankshaft 20 of the engine, one end portion of which projects downwardly beyond the mounting flange to have the cutter blade of a mower or other instrumentality to be driven secured thereto.

The outer end of the cylinder 17 is, of course, closed by a cylinder head 21 which is secured in place by bolts or capscrews 21'. As is customary, both the cylinder and the cylinder head have heat dissipating fins thereon.

The upper end of the crankshaft has a flywheel 22 fixed thereto which also serves as the rotor of the engine magneto, indicated generally by the numeral 23. Air propelling blades 24 on the upper face of the flywheel provide an air impeller or blower capable of delivering a substantial flow of cooling air for the engine. Duct means indicated generally by the numeral 25 directs the cooling air transversely across the finned cylinder 17 and cylinder head 21. The duct means includes a substantially cylindrical shroud portion 26 which embraces the flywheel and the air impeller vanes thereon, and a laterally projecting discharge portion 27 which extends over the cylinder and encompasses the cylinder head.

A rewind-type rope starter indicated generally by the numeral 28 is mounted on the shroud and connected in the customary manner with the upper end of the crankshaft to provide means for starting the engine.

The engine is of the L-head type and, hence, has intake and exhaust ports 30 and 31 in its cylinder casting. These ports are spaced apart lengthwise of the crankshaft axis with the intake port 30 nearest the air impeller or blower. As is customary, the ports open to valve seats 32 and 33 in the top or outer face of the cylinder casting, and with which the intake valves 34 and 35 coact in the customary manner.

It is significant to note that the intake port 30 opens toward that side of the cylinder which faces the impeller or blower, i.e. upwardly in the case of the vertical shaft engine shown in FIGURES 1–7; and that the exhaust port 31 opens laterally or horizontally away from the cylinder.

A muffler 36 is bolted to the cylinder casting over the mouth of the exhaust port 31. This muffler is of novel construction and forms the subject matter of a copending application, Serial No. 233,005, filed October 25, 1962.

Figure 4:
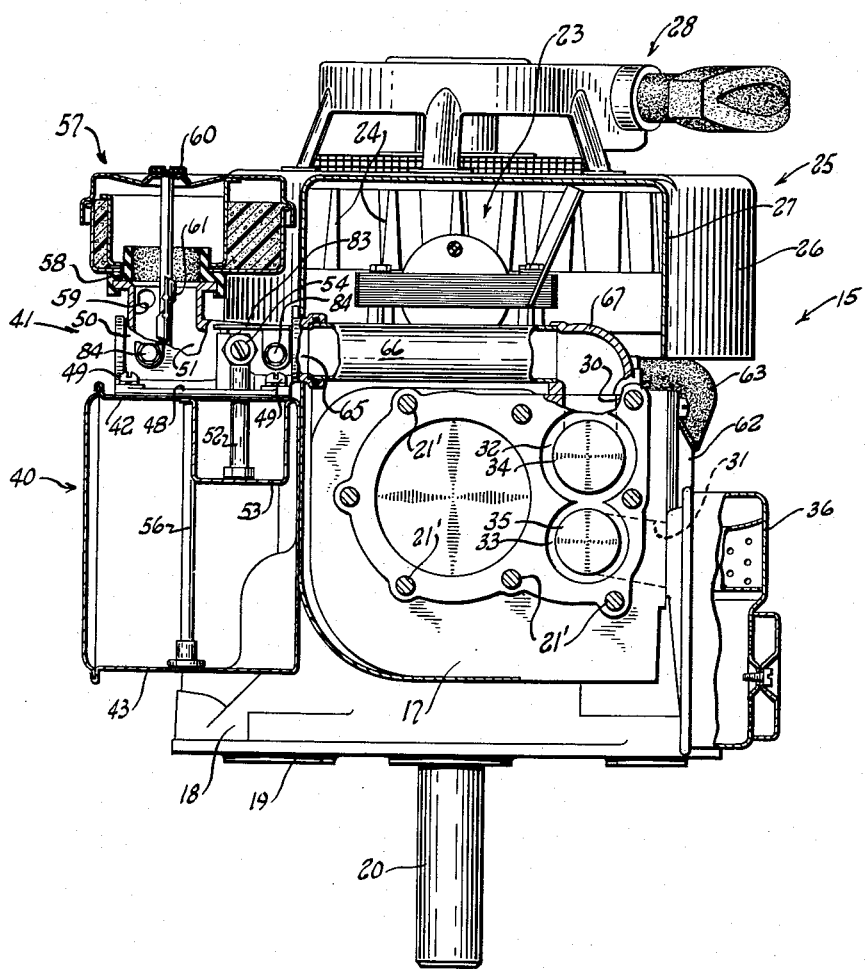
FIGURE 4 is a cross sectional view substantially on the plane of the line 4—4 in FIGURE 2.

At the side of the cylinder opposite that at which the intake and exhaust ports are located is a fuel tank 40 and a carburetor 41. The fuel tank 40 has a generally oblong or rectangular shape and is mounted directly alongside the cylinder crankcase casting with its top wall 42 and its bottom wall 43 substantially in line with the upper and lower sides of the cylinder—or, more specifically, the cooling fins on the cylinder, as best seen in FIGURE 4.

The tank 40 is secured in position by means of mounting brackets 44 and 45 spot welded to the opposite ends of the tank. The bracket 44 has a foot portion through which a bolt 46 passes to clamp the same to a pad on the crankcase cylinder casting; and the bracket 45, as best seen in FIGURE 1, projects over the cylinder head where it is secured in place by two of the bolts 21' which secure the cylinder head to the cylinder casting.

Inasmuch as the brackets 44 and 45 are spot welded to the opposite ends of the fuel tank, the points of securement of the tank to the engine are relatively widely spaced, and being as firmly anchored as they are, it follows that there is no likelihood whatsoever that the fuel tank will work loose as a result of engine vibration; and since the carburetor 41 is mounted upon the top wall 42 of the fuel tank by means of a relatively large flange 48, the bottom face of which seats squarely upon the top wall 42 of the tank, utmost assurance is had against loosening of the carburetor. The flange 48 may be secured to the top wall of the tank in any suitable way, as by cap screws 49.

The carburetor which embodies some novel features but which are the joint invention of Leo J. Lechtenberg, Robert K. Catterson, and Joseph V. Reichenbach, for which there is a copending divisional application, Serial No. 313,546, filed October 3, 1963, is of the type disclosed in the Brown et al. Patent No. 2,529,242. Hence, the carburetor has a die cast tubular body 50 which provides a mixture passage 51 in which the fuel and air is admixed and from which the fuel-air mixture issues for delivery to the intake port, and has the flange 48 formed integrally therewith. The fuel is drawn into the mixture passage 51 by engine suction through a suction tube 52 which projects perpendicularly from the bottom of the carburetor mounting flange 48 into a cup or reservoir 53 in the upper portion of the fuel tank (see FIGURE 4). The fuel delivered by the suction tube 52 enters the mixture passage of the carburetor through jets (not shown) under the control of a needle valve 54 in the customary manner.

The cup or reservoir 53 is kept filled with fuel from the fuel tank by an engine-suction actuated diaphragm pump 55, which is mounted on the side of a carburetor body opposite its needle valve, and the inlet of which has a suction feed tube 56 connected thereto to project down into the fuel tank with its suction mouth located near the bottom of the tank, as clearly shown in FIGURE 4.

Air enters the carburetor through an air cleaner 57 which preferably is of the type disclosed in Patent No. 2,999,562, and which is seated upon an upwardly facing flange 58 encircling the mouth of an air inlet port 59, being removably held in place by a screw 60 which extends axially down into the air inlet port and is threaded into the bottom wall of the carburetor body.

A choke valve 61 of novel construction and mounted in a rather novel manner, controls the admission of air into the carburetor.

The air cleaner 57 not only serves to clean the air fed to the carburetor, but also provides filtered communication between the atmosphere and a crankcase breather 62 which is preferably of the type shown in Patent No.

2,693,791, and hence is located on the side of the crankcase adjacent to the intake and exhaust ports. A tube 63 connects the crankcase breather with the air intake port of the carburetor, for which purpose the carburetor body has a tubular projection 64 at one side thereof connectible with the tube.

The discharge end portion 65 of the mixture passage of the carburetor is connected with the intake port 30 by a tube 66 which extends transversely across the upwardly facing side of the cylinder, in the vertical shaft engine of FIGURES 1–7, inclusive. As seen in FIGURE 4, one end of the tube 66 telescopes into the discharge end portion of the mixture passage and its opposite end is received in a die cast elbow 67 which is bolted to the top face of the crankcase cylinder casting over the mouth of the intake port 30.

As will be readily apparent from the drawings and the description thus far, it will be seen that the tube 66 which connects the carburetor with the intake port of the engine is actually embraced by the discharge portion of the duct means by which the flow of cooling air emanating from the blower is directed transversely across the cylinder, and that therefore this cooling air flows across the tube 66 before it reaches any of the hot surfaces of the engine. Consequently, the fuel-air mixture passing from the carburetor to the intake port 30 reaches the latter substantially uninfluenced by the heat radiating from the cylinder and especially from the extremely hot region of the exhaust port and the exhaust muffler.

It will also be apparent that the particular disposition of the intake and exhaust ports—namely, their spacing lengthwise of the crankshaft axis with the intake port nearest the blower—assures that the cooling air passes over the intake port and the surrounding portion of the cylinder casting before that air reaches the exhaust port.

It will also be apparent that in addition to delivering the fuel-air mixture to the intake port substantially uninfluenced by the heat emanating from the cylinder and the exhaust port, the particular structural arrangement described effects the desired symmetry. As already noted, the top and bottom walls of the fuel tank are substantially in line with the upper and lower extremities of the cooling fins on the cylinder. Viewed from the top, the tank and the exhaust muffler project substantially equal distances from the vertical plane which contains the axes of the cylinder and the crankshaft.

In another respect, the arrangement affords symmetry since it locates the carburetor in the space above the fuel tank alongside the discharge portion of the air guiding duct means with no part of the carburetor or its air cleaner projecting beyond the horizontal profile or outline of the fuel tank, and with the top of the air cleaner substantially in line with the top of the shroud 26.

Figure 11:
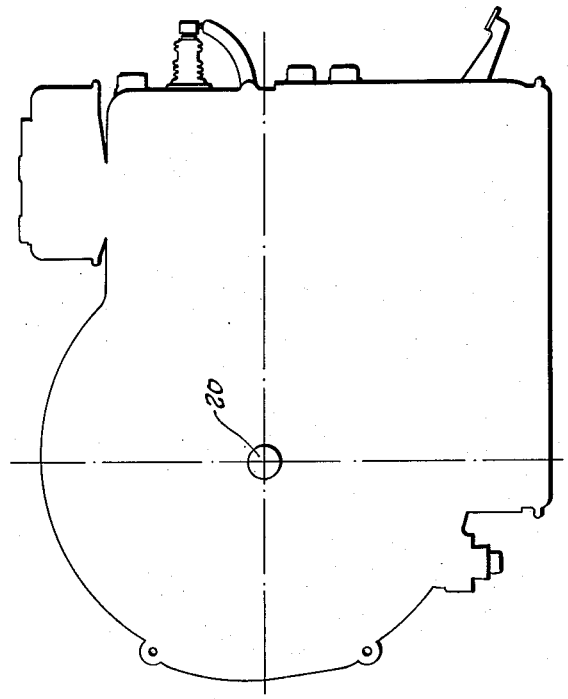
FIGURES 10 and 11 are top profile views, respectively, of the conventional engine and the engine of this invention, to graphically illustrate by comparison the lack of symmetry of the prior art engine, as compared to that of the engine of this invention.
Figure 10:
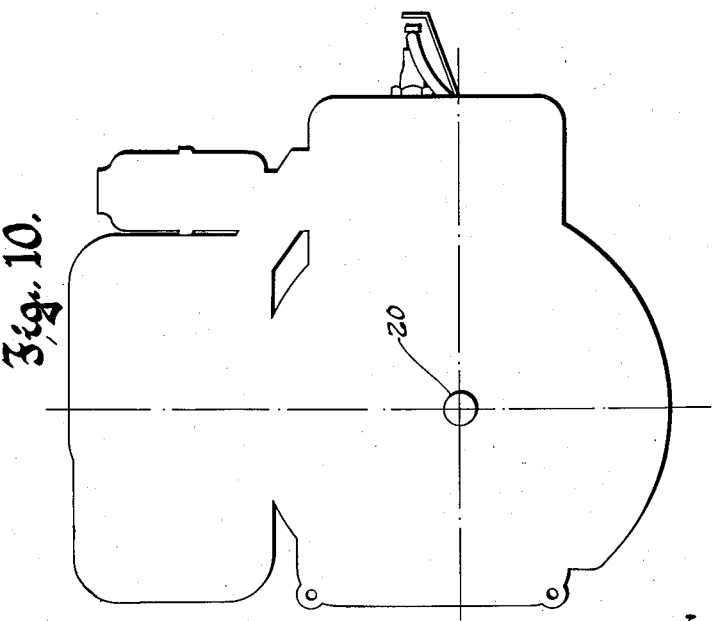

The exceptional symmetry achieved by the engine of this invention is graphically portrayed in the comparative views, FIGURES 10 and 11, which are horizontal outlines or profiles of the engine of this invention and of the earlier engine with which it most closely compares in horsepower and other important factors.

From a comparison of these views, it should be clear that the engine of this invention can be used in locations such as the riding type of mower discussed hereinbefore, that would entirely rule out the unsymmetrical prior art engine.

Also, not to be overlooked is the fact, noted earlier, that this invention has achieved a significant increase in horsepower without in anywise altering displacement or compression rating.

The elimination of the governor hunting problem explained before is still another feature of this invention which should not go unnoticed.

As indicated hereinbefore, the choke valve of the carburetor and its mounting are rather unique, but these features are part of the aforesaid joint invention claimed in the divisional application Serial No. 313,546. Both the choke valve 61 and its mounting shaft 68 are molded of plastic such as Delrin. The valve 61 is a generally circular disc having a hole 69 at its center of a size to permit the screw 60 which holds the air cleaner in place to pass therethrough. To enable the disc to be rotated by its mounting shaft 68 through 90°, the disc is formed with oppositely facing semicylindrical grooves 70 which embrace the screw 60 when the choke valve is in its full open position, and the inner ends 71 of these grooves, which actually provide the edges of the hole 69, are disposed at an angle of substantially 45° to the plane of the disc, to abut the sides of the screw when the disc is in its fully closed position. Accordingly, the screw passing through the choke valve disc serves to define the angle through which the choke valve may be turned.

The mounting shaft 68 of the choke valve is journalled in a bore 72 extending radially through the cylindrical wall which defines the air inlet port 59 and has a bifurcated inner end portion 73 projecting into the air inlet port to embrace the adjacent portion 74 of the choke valve disc. The slot defined by the bifurcations of the shaft is just wide enough to snugly receive the disc portion 74, and parallel ridges 75 on the opposite faces of the disc engage the edges of the slot to hold the disc against lateral edgewise displacement with respect to the mounting shaft.

Endwise separation of the shaft and disc is normally prevented by a detent consisting of a pair of ridges 76 on the opposite faces of this disc and transverse grooves 77 in the sides of the slot defined by the bifurcations of the shaft. To effect assembly of the choke valve and its shaft it is only necessary to insert the valve disc into the air inlet port, align its portion 74 with the bore 72 and insert the shaft 68, whereupon the inner bifurcated end portion of the shaft is slid onto the disc far enough to engage the detent between the shaft and the disc.

A torsion spring 78 on the outer projecting end portion of the shaft 68 biases the choke valve to its open position. One end of this spring is hooked onto a portion of the carburetor body and its other end engages a lug 79 projecting from the shaft. An arm 80 also projecting from the outer end portion of the shaft—and preferably disposed at a right angle to the lug 79—provides means by which the shaft may be rotated to close the choke valve. This is done by a control lever 81 which is pivoted, as at 82, to the top faces of a mounting plate 83 which, in turn, is attached to the carburetor body preferably by means of screws 84 passing through downwardly projecting flanges on the mounting plate and screwed into bosses on the side of the carburetor body. The mounting plate 83 is thus firmly attached to the carburetor.

The control lever 81 has an arm 85 which swings in an arcuate path so disposed with respect to the location of the arm 80 on the outer end of the choke valve shaft as to collide therewith as the control lever is moved in a clockwise direction, as viewed in FIGURE 7 beyond its full line position there shown.

Another arm 86 on the control lever 81 is connected through a spring 87 with a lever 88 connected in the customary manner with a mechanical governor, not shown, it being understood that the lever 88 is moved back and forth by the governor and that such motion thereof is transmitted to the throttle valve of the carburetor (not shown) through a link 89 which connects with an arm 90 fixed to the throttle valve shaft. The arm 90 has a portion thereof located to collide with a fixed abutment 91 and define the full open position of the throttle valve, and carries a screw 92 which engages the other side of the abutment 91 to define the closed position of the throttle valve, the adjustability of the screw 92 affording an idling adjustment for the engine.

The control lever 81 also provides the means for closing an ignition shorting switch, indicated generally by the numeral 93. The manner in which this switch is constructed and mounted on the plate 83 is rather novel, but again is part of the aforesaid joint invention. As shown, the ignition grounding switch 93 comprises a bifurcated spring metal stamping, having a short arm 94 and a longer arm 94'. This stamping is carried by an insulating mounting pad 95 to which it is secured by having its rear edge portion 96, which is curved downwardly, engaged with a ledge 97 on the underside of the mounting pad, in coaction with a novel connection between the short arm 94 of the stamping and a small boss 98 on the underside of the mounting pad. This boss projects through a hole 99 in the short arm 93 and a tongue 100 snaps over a ledge 101 on the boss. With the stamping thus attached to the pad 95, its long arm 94' lies flat against the underside of the pad with a finger 102 on its extremity projecting through a hole 103 in the mounting plate to be engaged by a portion of the control lever 81 when the latter is moved to its "Stop" position, the resilience of the stamping permitting the arm 94' to flex as the grounding connection is made.

The short arm 93 is sprung downwardly away from the pad and slightly beyond a hole 106 in the boss 98. This provides a convenient way of connecting a wire lead 107 with a metal stamping. To do so, the short arm 94 is pressed upwardly beyond the hole to allow the bared end of the wire to be inserted into the hole beneath the arm 94, which upon being released makes secure contact with the wire.

The insulated mounting pad 95 is attached to the plate 83 in its proper position by means of a pair of upwardly directed spaced fingers 108—109 on the pad which embrace the portion of the mounting plate lying between a slot 110 therein and its adjacent edge. Ridges 111 on the outer ends of these fingers snap over the edges of the embraced portion 110.

Preferably a stop 112 projects up from the mounting plate 83 into the path of the control lever 81 to provide a positive limit for the motion of the control lever toward its full choke position so as to preclude damage to the choke valve; and coacting detents on the lever and the mounting plate define the "Start," "Running," and "Stop" positions of the control lever.

The mounting plate 83 has still another function. When mounted on the carburetor it precludes separation of the shaft 68 from the choke valve disc. For this purpose, a lug 113 projects from the mounting plate in line with the outer end of the shaft.

Although the description thus far has concerned itself primarily with the vertical shaft engine illustrated in FIGURES 1–7, inclusive, it should be understood that the invention is not limited to that style of engine. This will be evident from FIGURES 8 and 9 which illustrate the inventive features adapted to a horizontal shaft engine. In this case, the horizontal profile of the engine, seen in FIGURE 8, is such that the extremities thereof at the opposite sides of the vertical plane containing the axes of the crankshaft and the cylinder are substantially equispaced therefrom.

The significant point of this adaptation of the invention is that the carburetor, and of course the fuel tank under it, are located at one side of the aforesaid plane, while the intake and exhaust port are located at the opposite side thereof. By this remote relationship, and the fact that the crossover tube, here identified by the numeral 66', by which the carburetor is connected with the intake port is embraced by the duct means which directs the flow of cooling air from the blower across the cylinder and is so located that the air flows across this tube before it reaches the hot surfaces of the engine, the advantages hereinbefore discussed are achieved.

From the foregoing description taken in connection with the accompanying drawings, it will be readily apparent to those skilled in this art that by this invention a substantial and significant advance has been made in the engine art, and that in attaining its primary purpose, namely, a more symmetrical engine, two entirely unexpected advantages were obtained—increased horsepower and correction of a serious governor problem.

What is claimed as my invention is:

1. A single cylinder air-cooled internal combustion engine having a crankshaft, a cylinder with intake and exhaust ports, and carburetor means to provide the engine with a fuel-air mixture, said engine being characterized by the following features:
   (A) the intake and exhaust ports are located at the same side of the cylinder and are spaced apart lengthwise of the crankshaft axis,
   (B) the carburetor means is mounted on the engine at the side of the cylinder diametrically opposite the location of the intake and exhaust ports, and
   (C) a tube extends transversely across an intervening side of the cylinder to connect the carburetor means with the intake port.

2. A single cylinder, air-cooled internal combustion engine having a crankshaft, a cylinder with intake and exhaust ports, a fuel tank, and carburetor means to provide a fuel-air mixture for the engine, said engine being characterized by the following features:
   (A) the intake and exhaust ports are at the same side of the cylinder and are spaced apart lengthwise of the crankshaft axis,
   (B) the fuel tank is mounted on the engine at the side of the cylinder diametrically opposite the intake and exhaust ports,
       (1) the fuel tank having a substantially flat top wall which in the normal position of use of the engine is horizontal,
   (C) the carburetor means is mounted on said top wall of the fuel tank, and thus supported by the tank, and
   (D) a tube extending transversely across an intervening side of the cylinder to connect the carburetor means with the intake port.

3. The engine of claim 2, further characterized by the following additional features:
   (A) crankshaft driven blower means to provide a flow of cooling air for the engine, and
   (B) duct means to direct the flow of cooling air induced by the blower means and to cause such air to flow successively across said tube and the cylinder.

4. A single cylinder vertical shaft air-cooled internal combustion engine having a crankshaft, the axis of which is vertical in the normal position of use of the engine, a cylinder the axis of which is horizontal in the normal position of use of the engine, the cylinder having intake and exhaust ports both at the same side of the cylinder and spaced apart lengthwise of the crankshaft axis, carburetor means to supply the engine with a fuel-air mixture, blower means on the upper end portion of the crankshaft to provide a flow of cooling air for the engine, and duct means to direct the flow of cooling air from the blower means downwardly across the cylinder, the engine being characterized by the following features:
   (A) the carburetor means is located at the side of the cylinder remote from the intake and exhaust ports and
   (B) a tube extends from the carburetor means to the intake port, said tube passing transversely across and above the top side of the cylinder so as to lie in the path of the cooling air flowing from the blower means to the cylinder.

5. The engine of claim 4, further characterized by the fact that the intake port is above the exhaust port so that the downwardly flowing cooling air sweeps across the region of the intake port before it reaches the region of the exhaust port.

6. A single cylinder vertical shaft internal combustion engine, having a crankshaft, the axis of which is vertical in the normal position of use of the engine, a cylinder the axis of which is horizontal in the normal position of use of the engine, the cylinder having intake and exhaust ports both located at the same side of the cylinder and spaced lengthwise with respect to the axis of the crankshaft, carburetor means to provide the engine with a fuel-air mixture, a fuel tank, and blower means to provide cooling air for the engine, the engine being characterized by the following features:

(A) the intake port opens upwardly from the top side of the cylinder, (B) the fuel tank is mounted on the engine at the side of the cylinder opposite that at which the intake and exhaust ports are located, and has a top wall substantially in line with the top side of the cylinder, (C) the carburetor means is mounted on said top wall of the fuel tank, (D) a tube extends horizontally across the top side of the cylinder and connects the carburetor means with the intake port, (E) the blower means is mounted on the upper portion of the crankshaft, and (F) duct means embracing the blower means, the tube and the cylinder to direct the flow of cooling air induced by the blower means first across the tube and then across the cylinder.

7. A single cylinder air-cooled internal combustion engine having a crankshaft, a cylinder with intake and exhaust ports, a muffler, carburetor means to supply the engine with a fuel-air mixture, a fuel tank, and crankshaft driven blower means to provide cooling air for the engine, said engine being characterized by the following features:

(A) the intake and exhaust ports are spaced apart lengthwise with respect to the axis of the crankshaft, (B) the intake and exhaust ports and the muffler are at one side of a plane containing the axes of the crankshaft and the cylinder, and the fuel tank and carburetor means are at the opposite side of said plane, (C) a tube intersects said plane and has one end thereof connected with the carburetor means and its other end connected with the intake port to conduct fuel-air mixture from the carburetor means to the intake port, and (D) duct means to direct the flow of air induced by the blower means successively across said tube and the cylinder.

8. An air-cooled internal combustion engine having a crankshaft, blower means driven by the crankshaft to provide a source of cooling air for the engine, a cylinder with intake and exhaust ports both located at the same side of the cylinder, duct means to direct the cooling air induced by the blower means towards and transversely across the cylinder, and carburetor means to provide the engine with a fuel-air mixture, said engine being characterized by the following features:

(A) the carburetor means is mounted on the engine at the side of the cylinder diametrically opposite the side thereof at which the intake and exhaust ports are located, (B) a tube located between the blower means and the cylinder to lie in the path of cooling air flowing from the blower means toward the cylinder extends from one to the other of said two sides of the cylinder and connects the carburetor means with the intake port to conduct the fuel-air mixture to the intake port substantially uninfluenced by the heat emanating from the region of the exhaust port, (C) the blower means is located at one end of the crankshaft, and (D) the duct means forms a shroud for the blower means and has a discharge portion embracing the cylinder and the tube, to positively direct the cooling air across the tube and then across the cylinder.

9. The engine of claim 8, further characterized by the following additional features:

(A) the intake and exhaust ports are spaced apart lengthwise of the crankshaft axis with the intake port nearest the blower means, and (B) the discharge portion of the duct means also embraces the connection of the tube with the intake port to direct cooling air thereacross and then across the exhaust port region of the engine.

10. The engine of claim 8, further characterized by the following additional features:

(A) the carburetor means is located at one side of a plane containing the axes of the crankshaft and the cylinder and the intake and exhaust ports are at the opposite side of said plane, and (B) the tube passes through said plane.

11. The engine of claim 8, further characterized by the following additional features:

(A) the intake port opens toward the end of the crankshaft at which the blower means is located, (B) the carburetor means is located at the side of the cylinder opposite that at which the intake and exhaust ports are located, and (C) the tube extends transversely across the side of the cylinder which faces towards the end of the crankshaft at which the blower means is located and has a substantially right-angular bend at its end which is connected with the intake port.

References Cited in the file of this patent
UNITED STATES PATENTS

| | | |
|---|---|---|
| 1,622,015 | Williams | Mar. 22, 1927 |
| 2,156,128 | Shaff | Apr. 25, 1939 |
| 2,201,603 | Wirth | May 21, 1940 |
| 2,326,335 | Dehn | Aug. 10, 1943 |
| 2,374,483 | Hansen | Apr. 24, 1945 |
| 2,611,346 | Sonderegger | Sept. 23, 1952 |
| 2,635,126 | Metzger | Apr. 14, 1953 |
| 2,700,377 | Chestnutt | Jan. 25, 1955 |
| 2,857,899 | Lardi | Oct. 28, 1958 |
| 3,024,774 | Eby | Mar. 13, 1962 |